AMINO SILICONE-SILICATE POLYMERS

Arthur N. Pines, Snyder, and Eugene A. Zientek, Kenmore, N.Y., assignors to Union Carbide Corporation, a corporation of New York
No Drawing. Filed Apr. 26, 1961, Ser. No. 105,537
10 Claims. (Cl. 260—448.2)

This application is a continuation-in-part of application Serial No. 777,577, filed December 2, 1958, now abandoned.

This invention relates to the use of novel organosilicon polymers in inhibiting the corrosion of metals that are in contact with aqueous solutions. More particularly, this invention relates to the use of novel organosilicon polymers as corrosion inhibitors in alcohol compositions that are adapted for use (as such or when diluted) as coolants in the cooling systems of internal combustion engines.

Anti-freeze compositions containing alcohols, especially ethylene glycol, are commonly mixed with the cooling water in the cooling systems of internal combustion engines in order to depress the freezing point of the water. The alcohols gradually decompose in the cooling systems to produce acidic products which lower the pH of the coolant. It has been found that in the cooling systems of internal combustion engines metallic surfaces in contact with such coolants become seriously corroded and that the corrosion becomes progressively worse as the pH of the coolant decreases. The decomposition of the alcohol, the lowering of the pH of the coolant, and the attendant corrosion of the metallic surfaces of the cooling system result in both a significant loss of alcohol through decomposition at low pH values and leakage in the cooling system.

Hence, considerable effort has been directed toward obtaining anti-freeze compositions that contain materials (corrosion inhibitors) which retard the corrosion of the cooling systems of internal combustion engines. It was also recognized that it would be most desirable if such inhibited anti-freeze compositions were single phase systems, since anti-freeze compositions containing two or more phases entail handling and dispensing problems in order to insure that the compositions as they reach the consumer contain the proper proportion of each phase.

Numerous anti-freeze compositions containing alcohols and inhibitors have been proposed to date. Such inhibitors include both organic materials and inorganic materials. Illustrative of the organic materials that have been used as inhibitors in anti-freeze compositions are: guanidine, citrates, coal tar derivatives, petroleum bases, thiocyanates, peptones, phenols, thioureas, tanin, quinoline, morpholine, triethanolamine, tartrates, glycol monoricinoleate, organic nitrites, mercaptans, organic oils, sulfonated hydrocarbons, fatty oils and soaps. Illustrative of the inorganic materials that have been used as inhibitors are: sulfates, sulfides, fluorides, hydrogen peroxide; the alkali metal chromates, nitrites, phosphates, borates, tungstates, molybdates, carbonates and silicates and alkali earth metal borates.

The various inhibited anti-freeze compositions proposed to date suffer from one or more disadvantages that limit their usefulness. Some are two phase compositions and so present handling and dispensing problems. Others contain inhibitors that do not adequately retard corrosion of any of the metals used in the cooling systems. Some contain inhibitors that inhibit the corrosion of some metals but are not particularly useful in inhibiting the corrosion of other metals. Still other disadvantages of known inhibited anti-freeze compositions are poor shelf life (e.g. tendency of alkali metal silicates to gel and/or form precipitates on standing), pronounced tendency of the inhibitors to attack rubber hoses that are part of the cooling systems, excessive foaming of the coolants to which they are added, tendency of the alcohols to decompose excessively to produce acidic products and tendency of the inhibitors to lose their corrosion inhibiting properties when employed outside a narrow temperature range and/or when in use for prolonged periods.

It is an object of this invention to provide improved anti-freeze and coolant compositions for use in the cooling systems of internal combustion engines that contain inhibitors that retard the corrosion of all of the metals which are suitable for use in such cooling systems.

Other objects of this invention are to provide improved anti-freeze and coolant compositions for use in the cooling systems of internal combustion engines that are single phase, that do not decompose appreciably to produce acidic products that accelerate corrosion, that have good shelf-life and that contain inhibitors which do not attack the rubber parts of the cooling system, which do not cause the coolant to which they are added to foam excessively, and which are useful over a wide temperature range even after prolonged periods of service in coolants.

The compositions of this invention are inhibited compositions comprising an alcohol and, as an inhibitor, a corrosion inhibiting amount of a novel organosilicon polymer that contains: (A) from 0.1 to 99.9 parts by weight (per 100 parts by weight of the polymer) of siloxane groups represented by the formula:

wherein Z is a hydrogen atom, a monovalent hydrocarbon group, or a hydroxy-substituted or amino-substituted monovalent hydrocarbon group, R is a divalent hydrocarbon group containing at least three carbon atoms, the $Z_2N-$ group is attached to at least the third carbon removed from the silicon atom, R' is a monovalent hydrocarbon group and $a$ has a value from 0 to 2; and (B) from 0.1 to 99.9 parts by weight (per 100 parts by weight of the polymer) of groups represented by the formula:

wherein M is a cation that forms a water soluble silicate; $b$ is the valence of the cation represented by M and has a value of at least one; and $c$ has a value from 1 to 3 inclusive.

The anti-freeze compositions of this invention are anhydrous or contain, in addition to the alcohol and the organosilicon inhibitor, a relatively small amount of water while the coolant compositions of this invention contain, in addition to the alcohol and the organosilicon inhibitor, relatively large amounts of water.

In addition to groups represented by Formula 1 and Formula 2, the novel organosilicon polymers used as inhibitors in the inhibited alcohol compositions of this invention can contain from 0.1 to 99.8 parts by weight (per 100 parts by weight of the polymer) of siloxane groups represented by the formula:

wherein R" is a monovalent hydrocarbon group and $d$ has a value of 0 to 3 inclusive.

The organosilicon polymers that are generally preferred as corrosion inhibitors in the inhibited alcohol compositions of this invention are those composed solely of groups represented by Formula 1 and Formula 2 which are present in the following amounts: from 12.5 parts to 50 parts by weight (per 100 parts by weight of the polymer) of groups represented by Formula 1 and from 50 parts to 87.5 parts by weight (per 100 parts by weight of the polymer) of groups represented by Formula 2. The presence in the organosilicon polymers of groups represented by Formula 3 may be desired in certain instances and, when such groups are present, it is preferred that the polymer be composed solely of groups represented by Formulae 1, 2, and 3 which are present in the following amounts: from 12.5 parts to 50 parts by weight (per 100 parts by weight of the polymer) of groups represented by Formula 1, from 37.5 parts to 87.5 parts by weight (per 100 parts by weight of the polymer) of groups represented by Formula 2 and from 12.5 to 50 parts by weight (per 100 parts by weight of the polymer) of groups represented by Formula 3.

The silicon atom in each group represented by Formulae 1, 2 and 3 is bonded through at least one oxygen atom to another silicon atom. In addition to the substituents indicated in these formulae, some or all of the silicon atoms in the groups represented by Formulae 1, 2, and 3 can be bonded to hydrogen atoms through oxygen (in which case the inhibitor contains the Si—OH group) and some or all of the silicon atoms in the group represented by the Formulae 1 and 3 can be bonded to monovalent hydrocarbon groups through oxygen (in which case the inhibitors contain Si—OR′ groups). It should further be recognized that the $$\frac{M_{\frac{1}{b}}OSi}{}$$

groups in the groups represented by Formula 2 can undergo equilibrium reactions with the water that is present in the preferred compositions of this invention. The latter reactions are illustrated, in the case of the KOSi groups, by the equation:

$$H_2O + KO\overset{|}{\underset{|}{Si}} \rightleftarrows KOH + HO\overset{|}{\underset{|}{Si}}$$

Illustrative of the hydroxy-substituted monovalent hydrocarbon group represented by Z in Formula 1 are the hydroxy-substituted alkyl groups such as the beta-hydroxyethyl and the beta-hydroxypropyl groups as well as poly(hydroxy)-substituted alkyl groups. Illustrative of the amino-substituted monovalent hydrocarbon groups represented by Z in Formula 1 are the amino-substituted alkyl groups such as the beta-aminoethyl and the gamma-aminopropyl groups as well as poly(amino)-substituted alkyl groups.

Illustrative of the cations that form water soluble silicates represented by M in Formula 1 are the various monovalent and polyvalent inorganic and organic cations that form water soluble silicates. Typical monovalent cations are alkaline metal cations [e.g. the sodium, potassium, lithium and rubidium cations]; and the tetraorgano ammonium cations [e.g. the tetra(alkyl) ammonium cations such as the tetra(methyl) ammonium cation, and the tetra(ethyl) ammonium cation; the tetra(mixed arylalkyl and mixed aralkyl alkyl) ammonium cations such as the phenyltrimethyl ammonium cation and the benzyl trimethyl ammonium cation; and the tetra(hydroxyalkyl) ammonium cation such as the tetra(hydroxyethyl) ammonium cation]. Typical of polyvalent cations are those produced by converting polyamines such as guanidine or ethylene diamine to poly ammonium hydroxides. Illustrative of such polyvalent cations are $$^{(+)}H_3NC(:NH)NH_3^{(+)} \text{ and } ^{(+)}H_3N(CH_2)_2NH_3^{(+)}$$

In the case of monovalent cations, the value of $b$ in Formula 2 is one and, in the case of the polyvalent cations, the value of $a$ in Formula 1 is at least 2 and preferably 2 or 3. The most preferred cations are sodium and, more especially, potassium.

Illustrative of the divalent hydrocarbon groups represented by R in Formula 1 are the linear alkylene groups (for example the trimethylene, —(CH₂)₃—, and the octadecamethylene, —(CH₂)₁₈— groups), the arylene groups (for example the naphthylene, —C₁₀H₆— and paraphenylene, —C₆H₄ groups); the cyclic alkylene groups (for example the cyclohexylene, —C₆H₁₀— group); the alkarylene groups (for example the tolylene, CH₃C₆H₃= group) and the aralkylene group (for example the —CH₂(C₆H₅)CHCH₂CH₂— group).

Illustrative of the monovalent hydrocarbon groups representend by Z and R′ in Formula 1 and R″ in Formula 3 are the linear alkyl groups (for example the methyl, ethyl, propyl, butyl and octadecyl groups), the cyclic alkyl groups (for example the cyclohexyl and cyclophentyl groups), the linear alkenyl groups( for example the vinyl and the butenyl groups), the cyclic alkenyl groups (for example the cyclopentenyl and the cyclohexenyl groups), the aryl groups (for example the phenyl and naphthyl groups), the alkaryl groups (for example the tolyl group) and the aralkyl group (for example the benzyl and beta-phenylethyl groups).

Preferred inhibitors employed in the inhibited alcohol compositions of this invention are those containing groups represented by Formulae 1 and 3 wherein each R′ group and any R″ groups each individually contained from 1 to 18 carbon atoms, wherein R contains from 3 to 18 carbon atoms and wherein $c$ has an average value from 0.25 to 2.0 and, most preferably, from 0.5 to 1.5.

Illustrative of the groups represented by Formula 1 are the groups having the formulae:

$$H_2NCH_2CH(CH_3)CH_2Si(CH_3)O$$
$$(HOCH_2CH_2)_2N(CH_2)_3SiO_{1.5}$$
$$H_2NCH_2C_6H_4SiO_{1.5}$$
$$H_2NC_6H_4CH_2CH_2SiO_{1.5}$$

and $$HOCH_2CH_2NH(CH_2)_3\underset{\underset{C_6H_5}{|}}{\overset{\overset{C_6H_5}{|}}{Si}}O_{0.5}$$

Illustrative of the groups represented by Formula 2 are the groups having the formulae: KOSiO₁.₅, NaOSiO₁.₅, (KO)₂SiO, (CH₃)₄NOSiO₁.₅, (NaO)₂SiO, (KO)₃SiO₀.₅ and (NaO)₃SiO₀.₅.

Illustrative of siloxane groups represented by Formula 3 are methylsiloxy, dimethylsiloxy, timethylsiloxy, ethyl (vinyl) siloxy, phenylethylsiloxy, phenylsiloxy, beta-phenylethyl (methyl) siloxy and diethylsiloxy groups.

Especially useful organosilicon inhibitors are those wherein the group represented by Formula 1 is more specifically represented by the formula:

$$\underset{Y}{\overset{H}{\diagdown}}NC_eH_{2e}SiO_{\frac{3-a}{2}} \quad R'_a \qquad (4)$$

wherein $C_eH_{2e}$ is an alkylene group, $e$ has a value of at least 1 and up to 10 and higher (preferably from 3 to 5), the HYN— group is attached to at least the third carbon atom removed from the silicon atom, Y is a hydrogen atom or a H₂NC_fH_{2f} group, C_fH_{2f} is an alkylene group, $f$ has a value of at least 2 and up to 10 or higher (preferably from 2 to 4 inclusive), the H₂N— group is attached to at least the second carbon atom removed from the HNC_eH_{2e} group), and R′ and $a$ have the meanings defined for Formula 1. Illustrative of the siloxane groups represented by Formula 4 are: gamma-aminopropylsiloxy, gamma-aminopropyl(methyl)siloxy, gamma-aminopropyl (dimethyl)siloxy, delta-aminobutylsiloxy, delta-aminobutyl(methyl)siloxy, delta - aminobutyl(dimethyl)siloxy, epsilon-aminopentylsiloxy groups and the like.

The organosilicon polymers employed as inhibitors in the inhibited alcohol compositions of this invention, as contrasted with other organsilicon compounds, were found to be characterized by their greater solubility in water. The solubility of these inhibitors is at least about 1 part by weight per 100 parts by weight of water but the most useful inhibitors are soluble to the extent of at least about 20 parts by weight and up to 40 parts by weight per 100 parts by weight of water.

The amount of the organosilicon inhibitor present in the inhibited alcohol compositions of this invention will vary widely from one application to another depending upon the temperature, type of metal or metals of which the cooling system is composed, type of alcohol in the composition, pH of the cooling water, velocity of the cooling water through the cooling system during operation, solutes (e.g. electrolytes such as chloride, sulfates and bicarbonates) or other materials in the cooling water and prior treatment or corrosion of the metal. In general, corrosion inhibiting amounts of the organosilicon inhibitors range from 0.1 part to 10 parts by weight per 100 parts by weight of the alcohol. Amounts of the organosilicon inhibitor from 1.0 part to 5.0 parts by weight per 100 parts by weight of the alcohol are preferred. The above ranges are given to indicate the generally useful and preferred amounts of the organosilicon inhibitor and may be departed from, though it is not usually desirable to do so since no advantage is gained thereby.

The alcohols that are useful in the inhibited alcohol compositions of this invention includes both monohydric alcohols (such as methanol, ethanol and propanol) and polyhydric alcohols (such as ethylene glycol, diethylene glycol, triethylene glycol, propylene glycol and glycerol). These alcohols include hydrocarbon alcohols and alcohols containing ether linkages. Mixtures of alcohols are also useful in the compositions of this invention. In view of its desirable physical properties (such as its low molecular weight, its low volatility and the ready solubility of organosilicon inhibitors in its aqueous solutions) ethylene glycol is an especially useful alcohol in these compositions. Useful alcohols are those that are soluble in water. When monohydric alcohols (e.g. methanol or ethanol) are used in the compositions along with an organosilicon polymer containing groups represented by Formula 2 wherein M is sodium or potassium, it is desirable to also employ a glycol (e.g. at least 10 parts by weight of ethylene glycol per 100 parts by weight of the monohydric alcohol) to further solubilize the polymer.

The compositions of this invention include both "concentrates" (i.e. inhibited alcohol solutions containing no water or relatively small amounts of water) and "coolants," (i.e. inhibited alcohol solutions containing relatively large amounts of water). The concentrates or anti-freeze compositions are adapted to economical shipment and storage and the coolants are adapted to use, as such, as heat transfer media in the cooling systems of internal combustion engines. In practice, the concentrate can be shipped to the point where it is to be added to the cooling system and there it can be diluted to form a coolant. Water imparts desirable properties to both the concentrate and coolant compositions of this invention, e.g. small amounts of water serve to lower the freezing point of the concentrate compositions and large amounts of water impart good heat transfer properties to the coolant compositions. The compositions of this invention can contain from 0 part by weight to 900 parts by weight of water per 100 parts by weight of the alcohol. It is desirable that the coolant compositions contain from 30 to 900 parts by weight of water per 100 parts by weight of the alcohol. It is desirable that the concentrates contain from 0.1 part to 10 parts by weight (or more desirably from 2 parts to 5 parts by weight) of water per 100 parts by weight of the alcohol. In the latter case, the amount of water with which the concentrate compositions is mixed to provide a coolant should be such that the resulting coolant composition contains from 30 parts to 900 parts by weight of water per 100 parts by weight of the alcohol. The relative amount of water and alcohol in these compositions can be varied to lower the freezing point of the compositions by the desired amount. The pH of the inhibited aqueous alcohol compositions of this invention should be greater than seven to minimize corrosion of metals with which the compositions come into contact.

If desired, various additives can be added to the inhibited alcohol compositions of this invention in particular instances for imparting special properties. By way of illustration, anti-foam agents, identifying dyes, pH indicators, conventional inhibitors, sealants which prevent leakage of the coolant from the cooling system, anti-creep agents which prevent seepage of the coolant into the crankcase and the like can be added to the compositions of this invention.

The inhibited alcohol compositions of this invention can be formed in any convenient manner, e.g. by adding an alcohol, the organosilicon inhibitor and water to a container and stirring the mixture.

The inhibited alcohol compositions of this invention inhibit the corrosion of all the metals that are suitable for use in the cooling systems of internal combustion engines. Such metals include the metals below sodium in the electromotive series (e.g. magnesium, aluminum, iron, copper, chromium, nickel, lead, tin and zinc) as well as alloys of such metals (e.g. tin solder, brass, bronze and steel). Such metals are solids at 25° C. and normally become corroded when in prolonged contact with aqueous alcohol solutions; particularly when the solutions are at elevated temperature and/or contain electrolytes (e.g. acidic solutes). The compositions of this invention are particularly applicable to inhibiting corrosion of cooling systems composed of iron, brass, copper and/or aluminum and the alloys of these metals.

The inhibitors in the inhibited alcohol compositions of this invention do not attack the rubber hoses which are a part of the cooling systems of internal combustion engines, do not decompose significantly during long periods of use, do not cause coolants to foam excessively and are useful over a wide temperature range.

The inhibited alcohol compositions of this invention that contain only an alcohol and the organosilicon inhibitor or that contain only an alcohol, water and the organosilicon inhibitor are single phase and hence they are free of the bulk handling and dispensing problems presented by two phase compositions. Of course, the compositions can, if desired, be made two phase (e.g. by the addition as an insoluble additive such as an insoluble known sealant).

Although the inhibited alcohol compositions of this invention are particularly suitable for use (as such or when diluted with water) as coolants in the cooling systems of internal combustion engines, they can be advantageously employed in other applications. Thus, the coolant compositions of this invention are generally used as heat transfer media. The concentrate compositions of this invention can be used as hydraulic fluids.

The organosilicon polymers used as corrosion inhibitors in the inhibited alcohol composition of this invention are novel compounds that have a variety of uses other than as corrosion inhibitors. By way of illustration, these novel polymers can be used as coating resins, laminating resins and molding resins according to known coating, laminating and molding procedures.

The novel organosilicon polymers of this invention are not limited in their usefulness as corrosion inhibitors to aqueous alcohol solutions which come into contact with metals. These novel organosilicon polymers are generally useful as inhibitors in any aqueous liquid which comes into contact with metals. Hence these polymers are admirably suited for use in the novel process of this invention for inhibiting the corrosion of metals that come into contact with aqueous liquids. The novel process of this invention involves adding to the aqueous liquid a corrosion inhibiting amount of the above-described organosilicon polymers.

In the practice of the process of this invention the organosilicon inhibitor is added to an aqueous liquid and, for best results, the inhibitor is then uniformly dispersed throughout the liquid. Any suitable means can be used to disperse the inhibitor throughout the liquid. Thus, in the case of moving liquids that are in contact with the metal to be protected, the inhibitor employed in this invention can be added to the liquid while the liquid is in use and dispersion of the inhibitor throughout the liquid is achieved by the movement of the liquid. However, the inhibitor can be added to the liquid (prior to the use of the liquid in contact with the metal to be protected) and the inhibitor can be dispersed throughout the liquid by stirring the liquid. This latter procedure is preferred where the liquid is to be stored or where the liquid undergoes little movement when in use. These procedures allow the inhibitor to readily dissolve in the water or aqueous solution.

The process of this invention is generally applicable to the protection of metals that come into contact with liquids containing water. Suitable liquids are pure water, aqueous solutions containing inorganic solutes and solutions containing water and water soluble organic compounds, especially water soluble or miscible organic liquids. Illustrative of suitable aqueous solutions containing inorganic solutes are aqueous sodium or potassium chloride refrigerating solutions, corrosive well water or river water containing normal chlorides, carbonates and sulfates which may be used as process or cooling water in industry, and the like. Illustrative of suitable solutions containing water and a water soluble organic liquid are solutions containing water and monohydric or polyhydric alcohols (e.g. methanol, ethanol, propanol, ethylene glycol, propylene glycol and glycero), hydroxy and alkoxy end-blocked polyalkylene oxides (such as polyethylene oxide), sulfoxides (such as methylsulfoxide), formamides (such as dimethylformamide) and cyclic ethers free of olefinic unsaturation (such as tetrahydrofuran dioxane and the like). Suitable solutions containing water and a water soluble organic liquid should contain at least 0.1 part by weight, or preferably at least 5.0 parts by weight, of water per 100 parts by weight of the water and the organic liquid.

The process of this invention is generally applicable to the protection of metals and alloys that are used in industrial processes and apparatus. Metals whose corrosion is retarded by the process of this invention include the metals below sodium in the electromotive series (e.g. magnesium, aluminum, copper, chromium, iron, manganese, nickel, lead, silver, tin, beryllium and zinc) as well as the alloys of such metals (e.g. brass, bronze, solder alloys, steel and the like). Such metals are solids at 25° C. and normally become corroded when in prolonged contact with water, particularly when the water is at elevated temperatures and/or contains electrolytes (e.g. acidic solutes). The process of this invention is particularly applicable to the protection of brass, iron, copper and aluminum.

The amount of the organosilicon inhibitor employed in the process of this invention is dependent upon the factors mentioned above in connection with the amount of inhibitor used in the compositions of this invention. Generally, from 0.01 part per 10 parts by weight of the inhibitor per 100 parts by weight of the aqueous liquid are used.

Compared with known processes for preventing corrosion of metals that are in contact with water, the process of this invention provides numerous advantages. Thus, the inhibitors used in the process of this invention can be added to a wide variety of aqueous solutions and inhibit a wide variety of metals. In addition, the inhibitors used in the process of this invention are effective over a wide temperature range and these inhibitors do not cause the liquids in which they are employed to foam excessively. Furthermore, these inhibitors do not promote the decomposition of organic compounds present in the water nor do they attack organic materials with which the water may come in contact.

The process of this invention is applicable to preventing the corrosion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The process of this invention is particularly applicable to inhibiting the corrosion of the cooling systems of internal combustion engines in contact with aqueous alcohol coolant compositions.

The organosilicon polymers employed as inhibitors in the compositions and process of this invention are the reaction products of from 1 part to 99 parts by weight of siloxanes containing a group represented by Formula 1 and from 1 to 99 parts by weight of a water soluble silicate. The starting siloxanes used in producing the organosilicon inhibitors employed in the compositions and process of this invention can contain, in addition to the groups represented by Formula 1 (or preferably the group represented by Formula 4), siloxane groups represented by Formula 3.

The starting siloxanes used in producing the organosilicon inhibitors employed in the compositions of this invention include such homopolymeric siloxanes as gamma-aminopropylpolysiloxanes, delta-aminobutylpolysiloxanes, gamma-aminopropylmethylsiloxane cyclic trimer and tetramer and delta-aminobutylmethylsiloxane cyclic trimer and tetramer. Useful starting siloxanes also include such copolymeric siloxanes as copolymers composed of gamma-aminopropylsiloxy and methylsiloxy groups, copolymers composed of delta-aminobutylmethylsiloxy and dimethylsiloxy groups and copolymers composed of epsilon-aminopentylsiloxy and phenylsiloxy groups.

The starting silicates used in producing the organosilicon inhibitors employed in the compositions and process of this invention are water soluble and composed of cation oxide units (i.e.

where M is the cation of a water soluble silicate and $b$ is the valence of the cation) and silicon dioxide units (i.e. $SiO_2$). These silicates can be represented by the average formula:

 (5)

wherein $n$ has a vale from 0.5 to 4, or preferably from 1.0 to 2.5, and wherein M and $b$ have the above-defined meanings. Illustrative of these silicates are the alkali metal orthosilicates [which have the formula $$(M^1{}_2O)_2(SiO_2)$$

where $M^1$ is an alkali metal], the alkali metal metasilicates [which have the formula $(M^1{}_2O)(SiO_2)$], the alkali metal tetrasilicates [which have the formula $(M^1{}_2O)(SiO_2)_4$], the alkali metal disilicates [which have the formula $(M^1{}_2O)(SiO_2)_2$], and the tetra(organo) ammonium silicates. Specific examples of these silicates are potassium metasilicate, sodium orthosilicate, potassium disilicate, lithium orthosilicate, lithium metasilicate, lithium disilicate, rubidium disilicate, rubidum tetrasilicate, mixed silicates (e.g. $Na_2O \cdot Li_2O \cdot 2SiO_2$ and

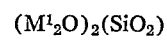

tetra(methyl) ammonium silicate, tetra(ethyl) ammonium silicate, phenyltrimethyl ammonium silicate, benzyltrimethyl ammonium silicate, guanidine silicate and tetra(hydroxyethyl) ammonium silicate. The preferred silicates are sodium and potassium silicates, especially sodium disilicate and potassium disilicate.

The starting silicate used in producing the organosilicon inhibitor can be added to the reaction mixture as such or it can be formed in situ by adding the appropriate hydroxide (e.g. NaOH or KOH) and silica to the reaction mixture.

The organosilicon polymers employed as inhibitors in the compositions and process of this invention are produced by forming a mixture of a siloxane containing a group represented by Formula 1 and a water soluble silicate and maintaining the mixture at a temperature at which the siloxane and the silicate react to produce the reaction product. The preferred process for producing these inhibitors includes forming the starting siloxane in situ by hydrolyzing suitable silanes and then reacting the siloxane and a silicate. This process involves forming a mixture of water, a silicate and a silane represented by the formula:

$$Z_2 N R' R'_a S i X_{3-a} \qquad (6)$$

wherein Z, R', a and R have the meaning defined for Equation 1 and X is an alkoxy group (such as a methoxy, ethoxy or propoxy group) and maintaining the mixture at a temperature at which the water and the silane react to form the starting siloxane and at which the siloxane so formed and the silicate react to produce the reaction product.

Silanes represented by the formula:

$$R''_d S i X_{4-d} \qquad (7)$$

wherein R and $d$ have the meanings defined in Formula 3 and X has the meaning defined in Formula 6 can be mixed with water, a water soluble silicate and a silane represented by Formula 6 and the mixture used in producing useful inhibitors from in situ formed siloxane copolymers containing groups represented by Formulae 1 and 3. Illustrative of silanes represented by Formula 7 are methyltriethoxysilane, dimethyldiethoxysilane, trimethylethoxysilane ethyl(vinyl)diethoxysilane, phenyl-(ethyl)diethoxysilane, phenyltriethoxysilane, betaphenylethyl(methyl)diethoxysilane, diethyldiethoxysilane.

The silanes represented by Formulae 6 and 7 are partially converted to siloxanes by hydrolysis and condensation reactions when mixed with water even at room temperature. Heating the mixture of the silane and water serves to complete the reaction. The siloxanes so formed then react with the alkali metal silicate.

The amount of water used in the preferred process for producing the inhibitors used in the compositions and process of this invention is at least that amount required to hydrolyze at least one group represented by X in Formulae 6 and 7. Amounts of water in excess of that amount required to hydrolyze all of the groups represented by X in Formulae 6 and 7 are usually preferred since it is generally desirable to have an excess of water present to serve as a medium within which the inhibitors can be formed. Thus, from 0.5 to 2000 moles of water per mole of the silanes represented by Formulae 6 and 7 are useful but from 25 moles to 70 moles of water per mole of the silanes represented by Formulae 6 and 7 are preferred. Although other amounts of water can be used they are usually not desirable since lesser amounts result in incomplete reaction and since greater amounts result in excessive dilution of the reaction mixture.

The inhibitors used in the compositions and process of this invention can also be prepared by forming a mixture of a pre-formed siloxane containing a group represented by Formula 1 and a water soluble silicate and maintaining the mixture at a temperature at which the siloxane and the silicate react to produce the reaction product. By way of illustration, a mixture can be formed containing a gamma-aminopropylpolysiloxane or a delta-aminobutylpolysiloxane and potassium or sodium disilicate and the mixture can be maintained at a temperature at which the siloxane and the silicate react to produce an inhibitor.

When pre-formed siloxanes containing a group represented by Formula 1 are employed as starting materials in producing the inhibitors employed in the compositions and process of this invention, it is desirable to conduct the reaction in a solvent for the reactants. Suitable solvents are water, ethanol-water solutions, water-ethylene glycol solutions, water-monoethyl ether of ethylene glycol solutions and the like. Amounts of these solvents from 10 parts to 10,000 parts by weight per 100 parts by weight of the starting siloxane and silicate are useful but amounts of the solvent from 100 parts to 1000 parts by weight per 100 parts by weight of the starting siloxane and silicate are preferred.

When the reaction of the starting siloxanes and silicates used in producing the inhibitors employed in the compositions and process of this invention is conducted in water, the inhibitor is obtained in the form of an aqueous solution. Such aqueous solutions are particularly useful since they have excellent shelf life and so can be stored for prolonged periods till needed. It is not necessary to separate the reaction product from the water in forming the anti-freeze compositions of this invention. The aqueous solution containing the desired amount of the inhibitor can be added to an alcohol to form an anti-freeze composition.

The temperature at which the starting siloxane (preformed or in situ formed) and silicate are maintained and at which they react to produce the inhibitors employed in the compositions and process of this invention can vary widely. Thus temperatures from 5° C. to 115° C. can be used. However, temperatures from 25° C. to 115° C. are preferred. The use of other temperatures is generally undesirable since no advantage is gained thereby. When the starting siloxane is being formed in situ, the conversion of the silanes represented by Formulae 6 and 7 to siloxanes is essentially completed by heating the mixture. The alkoxy groups in the starting silanes are converted to alcohols that are usually volatilized during the heating.

Starting siloxanes containing the group represented by Formula 1 and silanes represented by Formula 6 and processes for their production are disclosed in United States patent applications Serial Nos.: 615,480, filed October 12, 1956, now abandoned; 658,506, filed April 20, 1957, now abandoned; and 615,463, filed October 12, 1956, now abandoned. Organosilicon compounds containing the $NH_2CH_2C_6H_4Si\equiv$ group can be produced by reducing compounds containing the $$NCC_6H_4Si\equiv$$

group. By way of illustration, p-aminomethylphenyltriethoxysilane can be produced by forming a mixture of p-cyanophenyltriethoxysilane dissolved in toluene, hydrogen and a catalytic amount of nickel supported on alumina and heating the mixture to a temperature of about 150° C. to cause the p-cyanophenyltriethoxysilane and the hydrogen to react to produce para-aminomethylphenyltriethoxysilane. Silanes represented by Formula 6 where R" is an N-amino-organo-N-aminoorgano group can be produced by reacting a diamine and a halo-organo (hydrocarbonoxy) silane under anhydrous conditions with three moles of the diamine being present per mole of the silane at a temperature from 50° C. to 300° C., e.g. ethylene diamine can be reacted with gamma-chloropropyltriethoxysilane under the indicated conditions to produce $$H_2NCH_2CH_2\overset{H}{N}(CH_2)_3Si(OC_2H_5)_3$$

Since the inhibitors employed in the inhibited alcohol compositions of this invention can be formed by merely adding mixtures of suitable silanes or mixtures of silanes and water-soluble silicates to water, it is often advantageous to provide substantially anhydrous mixtures containing an alcohol, a suitable silane or mixture of silanes [i.e. a silane represented by Formula 6 or a mixture of silanes represented by Formulae 6 and 7] and a water soluble silicate. These mixtures preferably contain a hydroxide of a cation that forms a water soluble silicate.

Such substantially anhydrous mixtures require a minimum amount of storage space and, when needed, such mixtures can be added to the cooling water of the cooling system of an internal combustion engine and the inhibitor will be formed in the coolant. The alcohol- and inhibitor-containing coolants so produced are compositions of this invention.

Similarly, in the process of this invention, the organosilicon inhibitor can be added as such to the aqueous liquid. Alternately, materials can be added to the aqueous liquid which react with the water in the liquid to produce the inhibitor in situ. By way of illustration, a silane represented by Formula 6 or a mixture of silanes represented by Formulae 6 and 7 can be added to an aqueous liquid along with a water soluble silicate to produce the inhibitor in the liquid. As a further illustration, a siloxane composed solely of groups represented by Formula 1 or composed both of groups represented by Formulae 1 and 3 can be added to an aqueous liquid along with a water soluble silicate to produce the inhibitor in the liquid. In forming the inhibitor in situ, it is preferred to add a suitable hydroxide along wth the other reactants.

The improvements in corrosion inhibition resulting from the use of the compositions and process of this invention were found and evaluated by both elaborate laboratory tests designed to simulate field conditions and also carefully controlled dynamometer tests in full scale automotive equipment. In the examples given below, both types of evaluation tests were employed.

200-HOUR CORROSION TEST

This is a laboratory test which has proven over many years to be useful in evaluating inhibitors for use in aqueous alcohol anti-freeze solutions such as are used in the cooling systems of internal combustion engines. The test involves immersing clean strips of metal (usually iron, aluminum, brass and copper) and a brass coupon on which is a spot of solder, composed of 50 wt.-percent lead and 50 wt.-percent tin, in the test fluid with heating and aeration for a period of 200 hours. After this exposure, the specimens are cleaned and corrosion of the metal strips is measured by weight loss in milligrams. The corrosion of the spot of solder on the brass coupon is given a rating (called Solder Spot Rating, abbreviated SS in the examples) by visual inspection with a rating of 6 indicating little or no corrosion and a rating of 0 indicating very severe corrosion.

Each test unit consists of a 600 milliliter glass beaker equipped with a reflux condenser and an aeration tube. The test specimens are cut from $\frac{1}{16}$ inch sheet stock usually with a total surface area of about nine (9) square inches. Test temperature is 180–212° F. and aeration rate is 0.028 cubic feet per minute. Specimens are separated with Z shaped glass rods and are covered with 350 cc. of solution. Except where otherwise indicated, water used in preparing test solutions has 100 or 300 parts per million added of each of bicarbonate, chloride, and sulfate ions as sodium salts. This gives an accelerated corrosion rate that simulates the corrosion rate that prevails when natural water is used in actual practice. Duplicate tests are run simultaneously and both values or the average values of weight loss, final pH and final RA (defined below) are given.

PRE-RUSTED ENGINE TESTS

In the Pre-Rusted Engine Test a solution of 0.7 wt.-percent acetic acid dissolved in an aqueous ethylene glycol solution (67 vol.-percent $H_2O$) is added to the cooling system of a standard automobile engine that is mounted on a dynamometer stand. The engine is run for about 35 hours to cause rusting. Then the acetic acid solution is drained, the test and reference liquids are added and the test is run as described below. This test evaluates the performance of the test liquid under conditions of severe rusting.

Metal specimens (usually 4.5 sq. in. surface area) are inserted into the cooling system, usually in the radiator hoses, and results are evaluated by measuring weight losses of the metal specimens after measured time periods of operation which are equivalent to certain mileage. Samples of the coolants are withdrawn periodically and their pH, glycol content and reserve alkalinity (as defined below) are determined. The amount of the sample withdrawn is replaced by an equal volume of water. The compositions tested are diluted with water till the volume ratio of alcohol to water is about 1:1. The engine is run at a rate equivalent to 60 m.p.h. on a level road.

The engines used in the Pre-Rusted Engine Tests are equipped with cooling systems that are under atmospheric pressure. This allows for evaluation of the tendency of the test coolants to foam under conditions that are favorable to severe foaming.

The reserve alkalinity of an anti-freeze composition is a measure of the ability of the composition to resist a decrease in pH due to the presence of acidic materials. Reserve alkalinity (abbreviated RA in the examples) is determined by titrating a sample (about 10 cc.) of the composition with 0.1 N aqueous hydrochloric solution. From the number of milliliters of the acid actually required to neutralize the sample, the number that would be required to neutralize 100 milliliters of the composition if it contained a water to alcohol ratio of 3:1 on a volume basis is computed and this latter number is the reserve alkalinity of the composition.

In the following examples, BR is used as an abbreviation for brass. All of the compositions of this invention described in the examples below were single phase compositions.

The following examples illustrate the present invention.

Examples I to V illustrate the production of the novel organosilicon polymers that are useful as inhibitors in the compositions and process of this invention.

Example I

An aqueous potassium silicate solution was added to a 500 cc. three-necked, round-bottomed flask that was fitted with a stirrer, a thermometer, a distilling head and a dropping funnel. The solution contained 7.29 g. of $K_2O$, 15.9 g. of $SiO_2$ and 59.4 g. of water. Gamma-aminopropyltriethoxysilane (106.5 g.) was slowly added to the flask via the dropping funnel while agitating the contents of the flask. A precipitate formed. The mixture so formed was heated to boiling and a water-alcohol solution distilled from the mixture. Boiling was continued at a temperature of 102° C. in the flask while water (100 g.) was added to the flask. A total of 78 grams of distillate was collected over a period of about 2.5 hours. There was so obtained as a residue a clear water solution of the reaction product of the starting silicate and the in situ formed siloxane formed from the starting silane. This reaction production is denoted as Inhibitor A.

Example II

Water (1000 g.) and an aqueous potassium silicate solution (containing 190 g. of $K_2O$, 398 g. of $SiO_2$ and 832 g. of water) was added to a 5-liter, three-necked, round bottomed flask equipped with an agitator, a distilling head and a thermometer. The contents were agitated for a few minutes to secure homogeneity and then gamma-aminopropyltriethoxysilane (140 g.) was added slowly. The contents of the flask were maintained at the boiling point temperature of about 85° C. to 100° C. for 4.5 hours and 417 g. of a distillate (condensing at 78° C. to 99° C.) containing predominantly water and alcohol was collected. There was so produced as a residue a water solution of the reaction product of the starting silicate and the in situ formed siloxane formed from the starting silane.

Example III

A mixture was formed in a one-liter, three-necked, round-bottomed flask equipped with an agitator, a thermometer and a distilling head. The mixture contained 151 g. of $K_2SiO_3$, 452 g. of water, 38.8 g. of gamma-aminopropyltriethoxysilane and 31.7 g. of methyltriethoxysilane. The mixture became homogeneous when heated to 75° C.–80° C. The mixture was heated at its boiling point for 5.5 hours and a distillate was collected (67.5 g. composed chiefly of water and alcohol). At the end of this period the temperature in the flask was 104° C. and the vapor in the distilling head was at a temperature of 99.5° C.

There was so produced as a residue a clear water solution of the reaction product of the starting silicate and in situ formed siloxane produced from the starting silanes. This reaction product is denoted as Inhibitor I.

Example IV

Following the procedure described in Example I, several organosilicon polymers of this invention (Inhibitors B, C, D, E, F, G, H, J and K) were produced. The starting materials used in producing these products and Inhibitors A and I are shown on Table IA.

Example V

A reaction product suitable for use as an inhibitor in the compositions and process of this invention can be formed by dissolving a mixture of 5 grams of gamma-aminopropyl(methyl)polysiloxane and 25 grams of $Na_2SiO_3$ in 70 grams of water and heating the mixture for 8 hours at 102° C.

Example VI

The 200-Hour Corrosion Test was run using three reference compositions which had been diluted with water to produce test liquids that contain 100 parts by weight of ethylene glycol and 180 parts by weight of water. The results are shown on Table II.

TABLE II

| Reference | pH | | RA [1] | | Wt. losses mg./9 in. | | | | SS [2] |
|---|---|---|---|---|---|---|---|---|---|
| | I [3] | F [4] | I | F | Fe | Al | BR | Cu | |
| Uninhibited aqueous ethylene glycol | 6.9 | 4.9 | 0 | Acid | 1,739 | 40 | 196 | 186 | 4.5 |
| Formula A | 7.8 | 7.7 | 58 | 51 | 425 | 104 | 27 | 34 | 4.5 |
| Formula B | 7.8 | 7.7 | 56 | 56 | 15 | 15 | 11 | 20 | 6 |

[1] Reserve alkalinity.
[2] Solder spot rating.
[3] I is initial value.
[4] F is final value.

Formula A is a concentrate anti-freeze and is formed by mixing

| | Parts by weight |
|---|---|
| $Ca(BO_2)_2$ [formed by reacting $Ca(OH)_2$ with excess $H_3BO_3$] | 1.0 |
| Ethylene glycol | 95.88 |
| $H_2O$ | 2.00 |

Formula B is a commercially available two-phase anti-freeze concentrate composition that has achieved remarkable commercial success. It contains a water-

TABLE IA

| Inhibitor | Silane | | Silicate | |
|---|---|---|---|---|
| | Formula | Amount (grams) | Formula | Amount (grams) |
| A | $NH_2(CH_2)_3Si(OC_2H_5)_3$ | 106.5 | $(K_2O)(SiO_2)_{3.45}$ | 23.1 |
| B | $NH_2(CH_2)_3Si(OC_2H_5)_3$ | 108.5 | $(K_2O)(SiO_2)_{3.45}$ | 47.6 |
| C | $NH_2(CH_2)_3Si(OC_2H_5)_3$ | 20.5 | $(K_2O)(SiO_2)_{3.45}$ | 31.0 |
| D | $NH_2(CH_2)_3Si(OC_2H_5)_3$ | 16.5 | $(K_2O)(SiO_2)_{3.3}$ | 33.0 |
| E | $NH_2(CH_2)_3Si(OC_2H_5)_3$ | 7.0 | $(K_2O)(SiO_2)_{3.3}$ | 39.4 |
| F | $NH_2(CH_2)_4Si(OC_2H_5)_3$ | 12.5 | $(K_2O)(SiO_2)_{3.3}$ | 50.8 |
| G | $NH_2(CH_2)_3Si(OC_2H_5)_3$ | 77.5 | $K_2SiO_3$ | 151. |
| H | $NH_2(CH_2)_3Si(OC_2H_5)_3$ | 77.5 | $Na_2SiO_3$ | 131. |
| I | $NH_2(CH_2)_3Si(OC_2H_5)_3$ and $CH_3Si(OC_2H_5)_3$ | 38.8 / 31.7 | $K_2SiO_3$ | 151. |
| J | $CH_3NH(CH_2)_3Si(OC_2H_5)_3$ | 33 | $K_2SiO_3$ | 66.2 |
| K | $(CH_3CHOHCH_2)_2N(CH_2)_3Si(OC_2H_5)_3$ | 94.5 | $K_2SiO_3$ | 66.2 |

The groups present in these various inhibitors and the relative amounts of these groups are shown in Table IB.

ethylene glycol phase in which is dissolved an alkali earth metal borate and an organic oil phase.

TABLE IB

| Inhibitor | Siloxane Groups | | Groups having the formula $(KO)_cSiO_{4-c/2}$ | |
|---|---|---|---|---|
| | Formula | Parts [1] | Value of c | Parts [1] |
| A | $H_2N(CH_2)_3SiO_{1.5}$ | 69.7 | .580 | 30.3 |
| B | $H_2N(CH_2)_3SiO_{1.5}$ | 53.3 | .580 | 46.7 |
| C | $H_2N(CH_2)_3SiO_{1.5}$ | 29.8 | .580 | 70.2 |
| D | $H_2N(CH_2)_3SiO_{1.5}$ | 20.0 | .606 | 80.0 |
| E | $H_2N(CH_2)_3SiO_{1.5}$ | 8.2 | .606 | 91.8 |
| F | $H_2N(CH_2)_4SiO_{1.5}$ | 11.5 | .606 | 88.5 |
| G | $H_2N(CH_2)_3SiO_{1.5}$ | 20.4 | 1 | 79.6 |
| H | $H_2N(CH_2)_3SiO_{1.5}$ | 22.9 | [2] 1 | 77.1 |
| I | $H_2N(CH_2)_3SiO_{1.5}$ and $CH_3SiO_{1.5}$ | 10.6 / 6.5 | 1 | 82.9 |
| J | $CH_3NH(CH_2)_3SiO_{1.5}$ | 20.8 | 1 | 79.2 |
| K | $(CH_3CHOHCH_2)_2N(CH_2)_3SiO_{1.5}$ | 63.7 | 1 | 36.3 |

[1] By weight per 100 parts by weight of the inhibitor.
[2] $(NaO)_cSiO_{4-c/2}$.

The results obtained with ethylene glycol alone and with Formula A show the need for inhibitors in such systems. Formula B is a two-phase system and presents bulk handling and dispensing problems in commercial practice.

*Example VII*

A Pre-Rusted Engine Test was run on a commercially available single phase antifreeze composition. This composition contains water, an alkali metal borate and ethylene glycol. The results are shown in Tables III and IV.

TABLE III.—SOLUTION ANALYSIS

| Mileage | pH | Wt.-percent glycol* |
|---|---|---|
| 15 | 7.4 | 51.0 |
| 60 | 7.3 | 51.0 |
| 540 | 7.2 | 50.0 |
| 1,200 | 7.2 | 49.0 |
| 2,400 | 7.1 | 49.0 |
| 3,600 | 7.2 | 47.0 |
| 5,000 | 7.0 | 44.5 |
| 10,000 | 6.7 | 43.0 |
| 15,000 | 6.2 | 40.0 |

*Decrease due mostly to withdrawal of samples and replacement with water.

TABLE IV.—CORROSION

| Mileage | Wt. losses (mg. per 4.5 sq. in.) | | | SS |
|---|---|---|---|---|
| | Fe | Al | Cu | |
| 5,000 | 170 | 169 | 32 | 6 |
| 10,000 | 319 | 351 | 53 | 5.5 |
| 15,000 | 531 | 477 | 74 | 5.5 |

These results, when compared with the results obtained in Example VIII where a coolant composition of this invention is tested, show that less corrosion occurs when the compositions of this invention are employed.

*Example VIII*

A coolant composition of this invention was tested in the Pre-Rusted Engine Test. The composition contained 100 parts by weight of water, 100 parts by weight of ethylene glycol and 2.45 parts by weight of Inhibitor E. The following results were obtained.

I. Solution analysis data:

| Test miles | pH | Wt.-percent glycol | RA |
|---|---|---|---|
| 0 | 11.6 | 50 | 55 |
| 15 | 11.6 | 50 | 41 |
| 60 | 11.6 | 49 | 36 |
| 540 | 11.6 | 49 | 18 |
| 1,200 | 10.9 | 48 | 13 |
| 2,400 | 10.7 | 47 | 11 |
| 3,600 | 10.5 | 46 | 10 |
| 5,000 | 10.1 | 46 | 9 |
| 10,000 | 9.4 | 44 | 8 |
| 15,000 | 8.6 | 42 | 6 |
| 20,000 | 8.1 | 41 | 5 |
| 25,000 | 8.3 | 37 | 5 |
| 30,000 | 8.0 | 36 | 6 |
| 35,000 | 8.0 | 34 | 5 |

II. Corrosion data—metal specimens in radiator hose:

A. SPECIMEN CLEANED AND WEIGHED EVERY 5,000 MILES

| Test Miles | Wt. losses, mg./4.5 in.$^2$ | | | SS |
|---|---|---|---|---|
| | Fe | Al | Cu | |
| 5,000 | 1 | 0 | 4 | 6 |
| 10,000 | 1 | 0 | 12 | 6 |
| 15,000 | 5 | 1 | 24 | 5.5 |
| 20,000 | 6 | 1 | 40 | 5.5 |
| 25,000 | 10 | 2 | 56 | 5.5 |
| 30,000 | 19 | 2 | 69 | 5 |
| 35,000 | 29 | 4 | 79 | 5 |

B. SPECIMENS CLEANED AND WEIGHED ONLY AT INDICATED MILEAGES

| 5,000 | 1 | 0 | 4 | |
| 15,000 | 4 | 1 | 19 | |
| 35,000 | 49 | 4 | 89 | |

These results, when compared with the results obtained with known anti-freeze compositions in Example VII, demonstrate that less corrosion occurs when compositions of this invention are employed.

*Example IX*

The 200-Hour Corrosion Test was used to evaluate two coolant compositions of this invention and, for reference purposes, two compositions containing inorganic silicates. The indicated inhibitors were dissolved in solutions containing 180 parts by weight of water and 100 parts by weight of ethylene glycol. The water contained 300 parts by weight per million of chloride, sulfate and bicarbonate ions added as sodium salts. The results are shown on Table V.

TABLE V

| Inhibitor | Amount* | pH | | RA | | Wt. losses (mg./9 sq. in.) | | | | SS |
|---|---|---|---|---|---|---|---|---|---|---|
| | | I | F | I | F | Fe | Al | BR | Cu | |
| Inhibitor G | 1.38 | 11.5 | 10.4 | 53 | 47 | 2 | 0 | 2 | 3 | 6 |
| K$_2$SiO$_3$ | 1.12 | 11.6 | 10.6 | 55 | 42 | 7 | 17 | 1 | 4 | 5.5 |
| Inhibitor H | 1.14 | 11.7 | 10.5 | 62 | 58 | 2 | 0 | 2 | 3 | 6 |
| Na$_2$SiO$_3$ | 0.90 | 11.8 | 10.7 | 55 | 49 | 2 | 26 | 4 | 16 | 5.5 |

*Parts by weight per 100 parts by weight of the glycol.

The results show that the protection of the metals obtained using the coolant compositions of this invention is at least about equal to or superior to the protection obtained using compositions containing inorganic silicates.

*Example X*

The 200-Hour Corrosion Test was conducted employing compositions containing two different concentrations of two of the organosilicon inhibitors used in this invention and two different concentrations of two inorganic silicates. The compositions contained the indicated inhibitors dissolved in a solution containing 100 parts by weight of ethylene glycol and 180 parts by weight of water. The results obtained are shown on Table VI. The values given are the average values obtained in duplicate runs.

TABLE VI

| Inhibitor | Amount[1] | pH | | RA | | Wt. losses (mg./9 in.²) | | | | SS |
|---|---|---|---|---|---|---|---|---|---|---|
| | | I | F | I | F | Fe | Al | BR | Cu | |
| Inhibitor G | 0.69 | 11.2 | 10.5 | 37 | 23 | 7 | 0 | 4 | 5 | 5.5 |
| $K_2SiO_3$ | 0.56 | 11.3 | 10.3 | 29 | 21 | 2 | 7 | 2 | 4 | 5.5 |
| Inhibitor H | 0.57 | 11.1 | 10.6 | 32 | 27 | 5 | 0 | 3 | 4 | 5.5 |
| $Na_2SiO_3$ | 0.45 | 11.2 | 10.5 | 32 | 20 | 9 | 13 | 15 | 21 | 5.3 |
| Inhibitor G | 0.14 | 10.4 | 9.5 | 7 | 5 | 117 | 89 | 3 | 8 | 4.8 |
| $K_2SiO_3$ | 0.11 | 10.3 | 9.3 | 5 | 3 | 403 | 245 | 14 | 21 | 4.5 |
| Inhibitor H | 0.11 | 10.6 | 9.6 | 7 | 4 | 106 | 99 | 4 | 8 | 4.8 |
| $Na_2SiO_3$ | 0.09 | 10.6 | 8.7 | 8 | 2 | 324 | 192 | 10 | 17 | 4.5 |

[1] Parts by weight per 100 parts by weight of the glycol.

The results show the superior protection of aluminum and usually of the other metals as well obtained using the compositions of this invention at low inhibitor concentrations as compared to the protection obtained using silicate inhibited compositions at comparable concentrations.

*Example XI*

Several compositions were tested in the 200-Hour Corrosion Test. The results of the tests are shown on Table VII. The test liquid consisted of the indicated inhibitors dissolved in a solution containing 180 parts by weight of water and 100 parts by weight of ethylene glycol. For comparison purposes results of the same test using potassium silicate and an organic amine as inhibitors are also shown. The results demonstrate that the compositions of this invention allowed less corrosion in almost all cases than the liquids containing potassium silicate and the organic amine.

*Example XII*

The above-described procedure for the 200-Hour Corrosion Test was followed in this series of experiments except that these tests were conducted for 500 hours or 1000 hours. Two organosilicon inhibitors and, for reference purposes, two inorganic silicates were tested in solutions containing 180 parts by weight of water and 100 parts by weight of ethylene glycol. The results are shown on Table VIII. The values given are the average values for duplicate runs.

TABLE VIII

| Inhibitor | Amount* | pH | | RA | | Wt. losses (mg./9 sq. in.) | | | | SS |
|---|---|---|---|---|---|---|---|---|---|---|
| | | I | F | I | F | Fe | Al | BR | Cu | |
| 500 hour test: | | | | | | | | | | |
| Inhibitor G | 1.38 | 11.8 | 10.2 | 59 | 49 | 4 | 0 | 3 | 4 | 5.5 |
| $K_2SiO_3$ | 1.12 | 11.6 | 10.2 | 48 | 32 | 3 | 34 | 3 | 7 | 5.5 |
| Inhibitor H | 1.14 | 11.6 | 10.4 | 67 | 53 | 5 | 0 | 3 | 7 | 5.5 |
| $Na_2SiO_3$ | 0.90 | 11.7 | 10.6 | 59 | 47 | 1 | 0 | 8 | 30 | 5.5 |
| 1,000 hour test: | | | | | | | | | | |
| Inhibitor G | 1.38 | 11.6 | 10.7 | 56 | 37 | 5 | 0 | 4 | 6 | 5.8 |
| $K_2SiO_3$ | 1.12 | 11.6 | 9.9 | 48 | 10 | 606 | 309 | 6 | 106 | 5.3 |
| Inhibitor H | 1.14 | 11.8 | 10.4 | 62 | 32 | 10 | 0 | 5 | 12 | 6 |
| $Na_2SiO_3$ | 0.90 | 11.7 | 10.6 | 59 | 44 | 4 | 0 | 7 | 25 | 5.7 |

*Parts by weight per 100 parts by weight of the glycol.

The results show that the compositions of this invention afford at least about as good protection for the metals as is afforded by the reference compositions and in many cases afford superior protection.

*Example XIII*

Liquids containing inhibitors dissolved in solutions composed of from 2.3 parts to 4.6 parts by weight of water and from 95.4 parts to 97.7 parts by weight of glycol were stored in glass bottles for prolonged periods of time

TABLE VII

| Inhibitor | Amount[1] | pH | | RA | | Wt. losses (mg./9 in.²) | | | | SS |
|---|---|---|---|---|---|---|---|---|---|---|
| | | I | F | I | F | Fe | Al | BR | Cu | |
| Inhibitor A | 1.0 | 10.6 | 10.3 | 26 | 23 | 7 | 0 | 2 | 4 | 5.5 |
| | | | 10.4 | | 23 | 6 | 1 | 2 | 4 | 5.5 |
| Inhibitor B | 1.0 | 10.9 | 10.5 | 24 | 21 | 7 | 0 | 1 | 2 | 5.5 |
| | | | 10.5 | | 21 | 6 | 0 | 1 | 2 | 5 |
| Inhibitor B | 0.5 | 10.8 | 10.4 | 13 | 11 | 7 | 0 | 1 | 2 | 5 |
| | | | 10.4 | | 11 | 7 | 0 | 1 | 4 | 5 |
| Inhibitor E | 2.64 | 11.4 | 10.8 | 57 | 59 | 2 | 1 | 3 | 3 | 6 |
| | | | 10.6 | | 57 | 3 | 2 | 3 | 2 | 6 |
| Inhibitor E | 1.57 | 11.3 | 10.8 | 37 | 30 | 4 | 1 | 4 | 8 | 5.5 |
| | | | 10.7 | | 29 | 8 | 1 | 2 | 6 | 5.5 |
| Inhibitor I | 0.38 | 11.4 | 10.9 | 52 | 46 | 4 | 0 | 2 | 4 | 5.5 |
| | | | 10.9 | | 46 | 3 | 1 | 2 | 4 | 5.5 |
| Inhibitor C | 1.32 | 11.3 | 10.6 | 31 | 27 | 10 | 1 | 3 | 5 | 5.5 |
| | | | 10.4 | | 22 | 13 | 1 | 3 | 5 | 5.5 |
| Inhibitor F | 2.64 | 11.5 | 10.8 | 55 | 51 | 2 | 0 | 4 | 35 | 5.5 |
| | | | 10.8 | | 54 | 2 | 0 | 3 | 22 | 5 |
| Inhibitor G | 1.38 | 11.5 | 10.3 | 56 | 48 | 2 | 0 | 3 | 2 | 5.5 |
| | | | 10.6 | | 47 | 1 | 0 | 2 | 2 | 5.5 |
| Inhibitor H | 1.14 | 11.7 | 10.7 | 62 | 54 | 1 | 0 | 1 | 3 | 6 |
| | | | 10.6 | | 52 | 1 | 0 | 2 | 3 | 5.5 |
| $(K_2O)(SiO_2)_{3.45}$ | 1.8 | 11.2 | 10.6 | 47 | 34 | 2 | 27 | 0 | 1 | 5.5 |
| | | | 10.6 | | 30 | 14 | 41 | 1 | 2 | 5.5 |
| $(HOCH_2CH_2)_3N$ | 0.75 | 10.1 | 9.1 | 16 | 18 | 500 | 318 | 107 | 153 | 4.5 |
| | | | 9.3 | | 18 | 610 | 357 | 62 | 198 | 4.5 |

[1] Parts by weight per 100 parts by weight of the ethylene glycol.

at 50° C. and 100° C. in order to test their shelf life. The results are shown on Table IX. The results show that the shelf life of the compositions of this invention is as good as or better than the shelf life of compositions containing alkali metal silicates.

TABLE IX

| Inhibitor | Amount[1] | Gelation time (days) | |
|---|---|---|---|
| | | 50° C. | 100° C. |
| $K_2SiO_3$ | 1.1 | 60 | [2]1 |
| Inhibitor G | 1.4 | 60 | 20 |
| $Na_2SiO_3$ | 0.9 | 60 | 20 |
| Inhibitor H | 1.1 | 60 | 20 |
| $(K_2O)(SiO_2)_{3.3}$ | 1.0 | [2]10 | |
| $(Na_2O)(SiO_2)_{3.3}$ | 1.2 | [2]24 | |
| Inhibitor F | 1.0 | [2]41 | |
| Inhibitor E | 1.0 | [2]31 | |
| Inhibitor D | 1.0 | 110 | |
| Inhibitor C | 1.0 | 110 | |

[1] Parts by weight per 100 parts by weight of ethylene glycol.
[2] Gelation took place at end of this period; others had not gelled at the end of the test period.

Generally the length of the shelf life of glycol-water solutions containing alkali metal silicates or the organosilicon polymers used as inhibitors in this invention is proportional to the $M_2O$ to $SiO_2$ ratio in the silicate or organosilicon polymer. The $M_2O$ to $SiO_2$ ratio in $K_2SiO_3$ and $Na_2SiO_3$ is the same as that in Inhibitors G and H. The $M_2O$ to $SiO_2$ ratio in $(K_2O)(SiO_2)_{3-3}$ and in $(Na_2O)(SiO_2)_{3-3}$ is the same as in Inhibitors C, D, E, and F.

*Example XIV*

A Pre-Rusted Engine Test was run using Inhibitor G dissolved in a solution obtained by mixing equal weights of ethylene glycol and water. 1.38 parts by weight of Inhibitor G per 100 parts by weight of the glycol were used. The following results were obtained:

I. Solutions analysis:

| Test Miles | pH | Wt. percent | RA |
|---|---|---|---|
| 0 | 11.9 | 55.0 | 55 |
| 1,200 | 10.1 | 49.5 | 7 |
| 5,000 | 9.0 | 47.5 | 6 |
| 10,000 | 8.6 | 46.0 | 6 |
| 15,000 | 8.2 | 44.0 | 5 |
| 20,000 | 7.5 | 42.0 | 5 |
| 25,000 | 7.5 | 39.5 | 5 |
| 30,000 | 7.8 | 38.5 | 4 |
| 35,000 | 7.8 | 37.0 | 3 |

II. Corrosion:

A. SPECIMENS CLEANED AND WEIGHED EVERY 5,000 MILES

| Test miles | Wt. loss (mg./4.5 in.²) | | | SS |
|---|---|---|---|---|
| | Fe | Al | Cu | |
| 5,000 | 2 | 1 | 5 | 6 |
| 10,000 | 5 | 1 | 12 | 5.5 |
| 15,000 | 9 | 2 | 19 | 5.5 |
| 20,000 | 14 | 4 | 24 | 5.5 |
| 25,000 | 17 | 20 | 28 | 5.5 |
| 30,000 | 55 | 67 | 31 | 5.5 |
| 35,000 | 67 | 129 | 38 | 5 |

B. SPECIMENS CLEANED AND WEIGHED ONLY AT INDICATED MILEAGES

| Test miles | Wt. loss (mg./4.5 in.²) | | |
|---|---|---|---|
| | Fe | Al | Cu |
| 5,000 | 2 | 1 | 5 |
| 15,000 | 4 | 0 | 12 |
| 35,000 | 14 | 15 | 26 |

A comparison of these results with the results obtained with known anti-freezes (see Examples VII and XV) demonstrate the improvements provided by this invention, particularly improvements in corrosion protection.

*Example XV*

A pre-Rusted Engine Test was run using a commercially available two phase anti-freeze (i.e. Formula B) diluted with an equal weight of water. The following results were obtained.

I. Solution analysis:

| Test miles | pH | Wt. percent glycol |
|---|---|---|
| 15 | 7.3 | 52 |
| 5,000 | 7.3 | 43.5 |
| 10,000 | 7.5 | 36.0 |
| 15,000 | 7.6 | 34.0 |
| 25,000 | 7.1 | 31.5 |

II. Corrosion:

| Test Miles | Wt. Loss (mg./4.5 in.²) | | SS |
|---|---|---|---|
| | Al | Cu | |
| 5,000 | 28 | 8 | 6 |
| 10,000 | 120 | 19 | 5.5 |
| 15,000 | 129 | 48 | 5.5 |
| 20,000 | 256 | 74 | 5 |
| 25,000 | 315 | 99 | 5 |

The compositions of this invention are particularly suited for use in the cooling systems of internal combustion engines. However, their utility is not limited to such systems since they are generally useful in a heat exchange apparatus where alcohol-containing coolants can be employed.

From the foregoing examples it is seen that organosilicon polymers containing from 10 to 90 parts by weight of groups represented by Formula 1 and from 10 to 90 parts by weight of groups represented by Formula 2 and organosilicon polymers containing from 10 to 80 parts by weight of groups represented by Formula 1, from 10 to 80 parts by weight of groups represented by Formula 2 and from 10 to 80 parts by weight of groups represented by Formula 3 (these parts by weight being based on 100 parts by weight of the polymers) are particularly effective corrosion inhibitors.

What is claimed is:

1. An organosilicon polymer that consists essentially of: (A) from 10 to 90 parts by weight of siloxane groups represented by the formula:

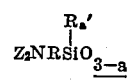

(I)

wherein Z is a member selected from the group consisting of the hydrogen atom, the unsubstituted monovalent hydrocarbon groups, and substituted monovalent hydrocarbon groups containing from 0 to 1 hydroxy group as a substituent and from 0 to 1 amino group as a substituent; R is a divalent hydrocarbon group free of olefinic and acetylenic unsaturation and containing at least three carbon atoms; the $Z_2N$ group is attached to at least the third carbon atom removed from the silicon atom; R' is a monovalent hydrocarbon group and $a$ has a value from 0 to 2 inclusive and (B) from 10 to 90 parts by weight of groups represented by the formula:

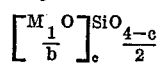

(II)

wherein M is a cation that forms a water soluble silicate selected from the group consisting of sodium, potassium, lithium, rubidium and the tetraorgano ammonium cations; $b$ is the valence of the cation represented by M and has a value of at least one and $c$ has a value from 1 to 3 inclusive, said parts by weight of said groups being based on 100 parts by weight of the organosilicon polymer.

2. The polymer of claim 1 which consists essentially of (A) from 12.5 to 50 parts by weight of groups represented by Formula I and (B) from 50 to 87.5 parts by weight of groups represented by Formula II and wherein M is potassium.

3. An organosilicon polymer that consists essentially of: (A) from 10 to 90 parts by weight of siloxane groups represented by the formula:

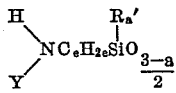

wherein Y is a hydrogen atom, $C_eH_{2e}$ is an alkylene group; $e$ has a value of at least 3, the

group is attached to at least the third carbon atom removed from the silicon atom; R' is a monovalent hydrocarbon group and $a$ has a value from 0 to 2 inclusive and (B) from 10 to 90 parts by weight of groups represented by the formula:

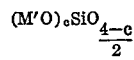

wherein M' is potassium and $c$ has a value from 1 to 3 inclusive, said parts by weight of said groups being based on 100 parts by weight of the organosilicon polymer.

4. An organosilicon polymer consisting essentially of: (A) from 12.5 to 50 parts by weight per 100 parts by weight of the polymer of siloxane groups represented by the formula:

$$H_2N(CH_2)_3SiO_{1.5}$$

and (B) from 50 to 87.5 parts by weight per 100 parts by weight of the polymer of groups represented by the formula:

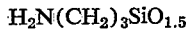

wherein $c$ has a value from 1 to 3 inclusive.

5. An organosilicon polymer consisting essentially of: (A) from 12.5 to 50 parts by weight per 100 parts by weight of the polymer of siloxane groups represented by the formula:

$$CH_3NH(CH_2)_3SiO_{1.5}$$

and (B) from 50 to 87.5 parts by weight per 100 parts by weight of the polymer of groups represented by the formula:

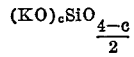

wherein $c$ has a value from 1 to 3 inclusive.

6. An organosilicon polymer consisting essentially of: (A) from 12.5 to 50 parts by weight per 100 parts by weight of the polymer of siloxane groups represented by the formula:

$$(CH_3CHOHCH_2)_2N(CH_2)_3SiO_{1.5}$$

and (B) from 50 to 87.5 parts by weight per 100 parts by weight of the polymer of groups represented by the formula:

wherein $c$ has a value from 1 to 3 inclusive.

7. An organosilicon polymer consisting essentially of: (A) from 12.5 to 50 parts by weight per 100 parts by weight of the polymer of siloxane groups represented by the formula:

$$H_2N(CH_2)_3SiO_{1.5}$$

and (B) from 50 to 87.5 parts by weight per 100 parts by weight of the polymer of groups represented by the formula:

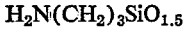

wherein $c$ has a value from 1 to 3 inclusive.

8. An organosilicon polymer that consists essentially of: (A) from 10 to 80 parts by weight of siloxane groups represented by the formula:

wherein Z is a member selected from the group consisting of the hydrogen atom, the unsubstituted monovalent hydrocarbon groups, and substituted monovalent hydrocarbon groups containing from 0 to 1 hydroxy group as a substituent and from 0 to 1 amino group as a substituent; R is a divalent hydrocarbon group free of olefinic and acetylenic unsaturation and containing at least three carbon atoms; the $Z_2N$ group is attached to at least the third carbon atom removed from the silicon atom; R' is a monovalent hydrocarbon group and $a$ has a value from 0 to 2 inclusive; (B) from 10 to 80 parts by weight of groups represented by the formula:

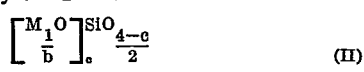

wherein M is a cation that forms a water soluble silicate selected from the group consisting of sodium, potassium, lithium, rubidium and the tetraorgano ammonium cations; $b$ is the valence of the cation represented by M and has a value of at least one and $c$ has a value from 1 to 3 inclusive and (C) from 10 to 80 parts by weight of siloxane groups represented by the formula:

wherein R" is a monovalent hydrocarbon group and $d$ has a value from 0 to 3 inclusive, said parts by weight of said groups being based on 100 parts by weight of the organosilicon polymer.

9. An organosilicon polymer that consists essentially of: (A) from 10 to 80 parts by weight of siloxane groups represented by the formula:

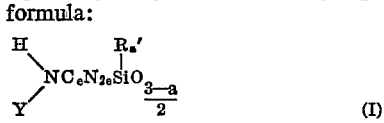

wherein Y is a hydrogen atom; $C_eH_{2e}$ is an alkylene group; $e$ has a value of at least 3, the

group is attached to at least the third carbon atom removed from the silicon atom; R' is a monovalent hydrocarbon group and $a$ has a value from 0 to 2 inclusive, (B) from 10 to 80 parts by weight of groups represented by the formula:

wherein M' is potassium and $c$ has a value from 1 to 3 inclusive and (C) from 10 to 80 parts by weight of siloxane groups represented by the formula:

wherein R" is a monovalent hydrocarbon group and $d$ has a value from 0 to 3 inclusive, said parts by weight of said groups being based on 100 parts by weight of the organosilicon polymer.

10. An organosilicon polymer consisting essentially of: (A) from 12.5 to 50 parts by weight per 100 parts by weight of the polymer of siloxane groups represented by the formula:

$$H_2N(CH_2)_3SiO_{1.5}$$

(B) from 37.5 to 75 parts by weight per 100 parts by weight of the polymer of groups represented by the formula:

$$(KO)_bSiO_{\frac{4-c}{2}}$$

wherein $c$ has a value from 1 to 3 inclusive and (C) from 12.5 to 50 parts by weight per 100 parts by weight of the polymer of groups represented by the formula:

$$CH_3SiO_{1.5}$$

References Cited by the Examiner

UNITED STATES PATENTS

| | | | |
|---|---|---|---|
| 2,467,177 | 4/49 | Zimmer | 252—75 |
| 2,693,451 | 11/54 | Heisig | 252—75 |
| 2,762,823 | 9/56 | Speier | 260—448.2 |
| 2,832,754 | 4/58 | Jex et al. | 260—448.2 |
| 2,973,383 | 2/61 | Black | 260—448.2 |
| 3,044,982 | 7/62 | Jex et al. | 260—448.2 |
| 3,045,036 | 7/62 | Jex et al. | 260—448.2 |

FOREIGN PATENTS 1,104,763  4/61  Germany.

TOBIAS E. LEVOW, *Primary Examiner.*

JULIUS GREENWALD, ALPHONSO D. SULLIVAN, *Examiners.*